United States Patent [19]

Tilton et al.

[11] Patent Number: 5,322,307
[45] Date of Patent: Jun. 21, 1994

[54] CHASSIS FOR TRANSPORTABLE MOUNTING OF VIBRATING EQUIPMENT

[75] Inventors: Stephen W. Tilton, White Bear Lake; Marvin Stumpf, Winona, both of Minn.

[73] Assignee: Tilton Equipment Company, St. Paul, Minn.

[21] Appl. No.: 122,122

[22] Filed: Sep. 16, 1993

Related U.S. Application Data

[63] Continuation of Ser. No. 19,805, Feb. 16, 1993, Pat. No.

[51] Int. Cl.⁵ .................................................. B62B 5/00
[52] U.S. Cl. ............................... 280/47.24; 280/47.33; 280/763.1; 241/101.7; 248/635
[58] Field of Search .................... 280/47.24, 47.33, 63, 280/302, 763.1, 766.1, 788; 241/92, 101.7; 248/634, 635

[56] References Cited

U.S. PATENT DOCUMENTS

| | | | |
|---|---|---|---|
| 1,977,896 | 10/1934 | Saurer | 248/635 |
| 2,757,937 | 8/1956 | Illsley | 280/47.33 |
| 2,969,885 | 1/1961 | Lutz | 280/763.1 X |
| 3,240,247 | 3/1966 | Lautzenheiser | 241/101.7 |
| 3,716,198 | 2/1973 | Lautzenheiser | 241/101.7 X |
| 3,907,216 | 9/1975 | Mackissic et al. | 241/152.2 |
| 4,469,348 | 9/1984 | Crook | 280/763.1 X |
| 4,773,601 | 9/1988 | Urich et al. | 241/101.7 |
| 5,018,672 | 5/1991 | Peck et al. | 241/37.5 |

Primary Examiner—Brian L. Johnson
Attorney, Agent, or Firm—Patterson & Keough

[57] ABSTRACT

A chassis for the transportable mounting of vibrating equipment includes a main frame for supporting the vibrating machinery, a ground engaging wheel assembly at one end of the main frame, a ground engaging support bracket member positioned at the opposed end of the main frame, and a point coupling member for connecting the bracket member to the main frame. The coupling member includes an elastomeric, generally disk-shaped damping member interposed between the main frame and the support bracket at the intersection of the support bracket with the center line of the main frame. A threaded bolt and nut assembly is received through the damping member for adjustable compression of the damping member. The support bracket is received through notches in downwardly depending side flanges of the main frame, limiting the range of relative motion between the main frame and the support bracket.

7 Claims, 2 Drawing Sheets

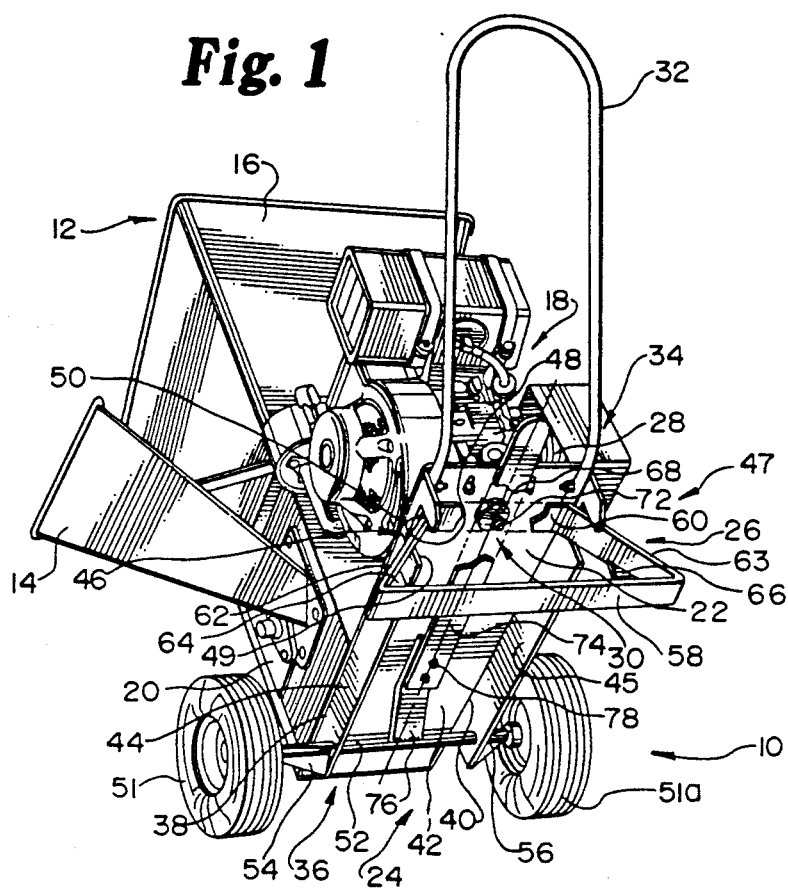

CHASSIS FOR TRANSPORTABLE MOUNTING OF VIBRATING EQUIPMENT

This application is a continuation of Ser. No. 08/019,805 filed Feb. 16, 1993, now abandoned, which is a continuation of Ser. No. 97/922,840 filed Jul. 31, 1992, now abandoned.

FIELD OF THE INVENTION

The present invention relates to devices for mounting vibrating machinery. More specifically, the present invention relates to a chassis especially adapted for the mounting of self-powered pieces of equipment, such as a leaf or chip shredder, on to an easily transportable frame.

DESCRIPTION OF THE BACKGROUND ART

Equipment powered by rotating prime movers is commonplace in both industrial and domestic settings. While such prime movers provide efficient sources of operating power, they have the drawback of imparting unwanted vibration to the equipment and supporting frames to which they are attached. The unwanted vibration can lead to metal fatigue and reduction of the life span of the machine. Moreover, the vibrations often result in unwanted movement of the equipment over the ground, floor or other support surface while the equipment is being operated. While movement of the equipment or machinery can be prevented by securing the support assembly that the equipment is mounted on to the ground, floor or other operating surface, the need to secure and unsecure portable equipment to its operating surface before and after it is operated detracts from the very portability for which the equipment is designed.

Shredding equipment used for grinding bushes, branches, or other organic matter into small pieces is an example of a self-powered, vibrating piece of equipment. Representative designs of such shredding equipment are disclosed in U.S. Pat. Nos. 3,240,247, 3,861,603, 3,907,216, 4,773,601, and 5,018,672. As will be appreciated, shredding equipment must be portable so as to be transportable from job site to job site where shredding is to be accomplished. The source of operating power for such shredding machines is generally an internal combustion engine. The vibration imparted to the shredder by the operation of the engine, as well as the vibration caused by the shredding assembly of the machine, can cause unwanted and dangerous movement of the shredder along the ground as it is operated.

A mounting assembly for mounting vibrating machinery to a portable frame that would enable the machinery to operate without vibration-induced movement over the ground, floor or other operating surface would provide decided advantages.

SUMMARY OF THE INVENTION

The problems outlined above are in large measure solved by the chassis for transportable mounting of vibrating equipment in accordance with the present invention. The chassis is especially designed to dampen the transmission of vibration produced by the mounted equipment to the main frame supporting the equipment such that vibration-induced movement of the equipment over the ground, floor, or other operating surface is negligible.

The chassis hereof comprises a main frame for supporting the vibrating machinery, a ground engaging wheel assembly at one end of the main frame, a ground engaging support bracket member positioned at the opposed end of the main frame, and a point coupling member for connecting the bracket member to the main frame. The coupling member includes an elastomeric, generally disk-shaped damping member interposed between the main frame and the support bracket at the intersection of the support bracket with the center line of the main frame. A threaded bolt and nut assembly is received through the damping member for adjustable compression of the damping member. The support bracket is received through notches in downwardly depending side flanges of the main frame, limiting the range of relative motion between the main frame and the support bracket.

BRIEF DESCRIPTION OF THE DRAWINGS

FIG. 1 is a perspective view of a portable chassis for transportable mounting of vibrating equipment in accordance with the present invention, depicting a wood chip shredder mounted on the chassis;

FIG. 2 is a side elevational view of the chassis and shredder of FIG. 1;

DETAILED DESCRIPTION OF THE INVENTION

Figure 3:
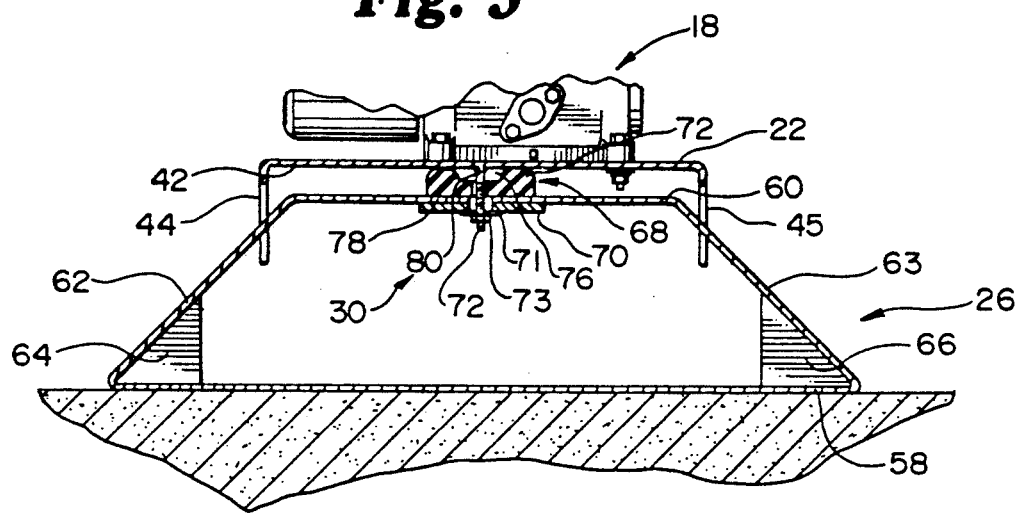
FIG. 3 is a fragmentary, sectional view taken along line 3—3 of FIG. 2.

Referring now to the drawings, wherein like reference numerals denote like elements throughout the several views, FIGS. 1-4 illustrate the components comprising the apparatus of the present invention.

Referring to FIG. 1, a portable chassis 10 used for transporting and mounting vibrating equipment is depicted with a wood chip shredder 12 mounted thereon. Wood chip shredder 12 broadly includes output chute 14, input bin 16, internal grinding apparatus (not shown), a gasoline powered prime mover 18, and impeller housing 20.

The portable chassis 10 in accordance with the present invention broadly comprises a main frame 22, a wheel assembly 24, a support bracket member 26, a towing bar hitch 28, a coupling member 30, and a handle 32.

Main frame 22 is generally planar and rectangular in shape, although the shape can be varied to adapt to the type of equipment which will be supported thereon. Main frame 22 has a first end 34 and a second end 36. Opposed, generally parallel main frame side margins 38, 40 extend between first and second main frame ends 34, 36. The main frame presents a lower surface 42 and an upper surface 43. Main frame center line C extends between first end 34 and second end 36 of main frame 22.

Opposed side flanges 44, 45 depend downwardly from side margins 38, 40 of main frame 22. Side flanges 44, 45 include opposed, support bracket member receiving notches 46, 47 adjacent the first end 34 of main frame 22. Notches 46, 47 each present fore and aft abutment margins 48, 49, and upper abutment margin 50. Handle 32 is attached to side margins 44, 45 near first end 34 of main frame 22.

Wheel assembly 24 comprises a pair of opposed wheels 51, 51a which are rotatably mounted on a common axle 52. Common axle 52 has a first end attached to the left wheel 51 and a second end attached to the right wheel 51a. Common axle 52 is supported by and extends through side flanges 44, 45. Supporting gussets 54, 56 extend from the first end and the second end of common axle 52 to side flanges 44, 45.

Support bracket member 26 comprises a lowermost ground engaging channel 58, an upper main frame attachment channel 60, and side channels 62, 63. Side channels 62, 63 slope downwardly and outwardly from main frame attachment channel 60 toward ground engaging channel 58. Ground engaging channel 58 extends transversely and normal to the center line of main frame 22 and outwardly beyond side margins 44, 45. As best depicted in FIG. 3, the support bracket member presents a trapezoidal profile. Support flanges 64, 66 extend between side channels 62, 63 and ground engaging side 58. Support bracket member side channels 62, 63 are received within notches 46, 47 on side margins 44, 45. Abutment margins 48, 49, 50 are spaced apart from the support bracket member side channels 62, 63. Support bracket member 26 is securely attached to main frame 22 by coupling member 30 along the center line of main frame 22.

Referring to FIGS. 1 and 3, coupling member 30 comprises vibration damper element 68, hinge plate extension 70, and threaded connector bolt 72. Threaded connector bolt 72 is received through vibration damper element 68, with the vibration damper element 68 positioned between the main frame lower surface 42 and main frame attachment channel 60 of support bracket member 26. The connector bolt 72 may be permanently carried by the maine frame 22, or may be received through an aperture (not shown) in the main frame 22. Connector bolt 72 extends through hinged plate extension 70, main frame attachment channel 60, and vibration damper element 68 at the intersection of the center line of main frame 22 and support bracket member 26. Washer 71 and tightening nut 73 are carried by threaded connector bolt 72.

Vibration damper element 68 is formed from a resilient, elastomeric material, such as an industrial type rubber. The element 68 presents a disk shaped appearance having an upper annular rim 74 defining a central recess 76, generally planar lower surface 78, and centered, connector bolt receiving channel 80.

Towing bar hitch 28 is positioned along the center line of lower surface 42 of main frame 22. Towing hitch 28 is a two piece member comprised of hitch member 84 and axle member 86, which overlap and are securely coupled together by bolts 88. Axle member 86 is attached to common axle 52 at one end and to hitch member 84 at a second end by bolts 88. The two piece design of towing hitch 28 provides for the attachment of various sized hitch members 84 to adjust the length of hitch 28, as well as to provide for detachment of the hitch member 84 for shipping purposes.

In operation, a piece of vibrating equipment, such as wood chip shredder 12, is secured to upper surface 43 of main frame 22. The equipment then becomes easily transportable by raising support bracket member 26 off of the ground by lifting up handle 32 and pulling chassis 10 to the desired location or position on wheels 51, 51a. Alternatively, portable chassis 10 can be hooked to a tractor or other vehicle using towing hitch 28 so that the support bracket member 26 is raised off of the ground or operating surface and moved to the location or position desired. Towing bar hitch 28 transmits the towing forces from hitch member 84 to main frame 22 through axle member 86.

The mounting system of the present invention can be adjusted to compensate for different levels of vibration by adjusting the amount of compression exerted on vibration damper element 68. More particularly, nut 73 can be tightened against washer 71 and hinge plate extension 70, thereby compressing the element 68 and effectively altering the hardness of the damper element 68. Alternatively, nut 73 can be loosened, thereby easing the compression of element 68 such that vibration damper element 68 will absorb more of the vibration produced by the machinery. It will be apparent from viewing the drawings that the damper element 68 can be easily replaced by removing the nut 73 from the bolt 72, and disassembling the element 68 from the bolt 72.

Figure 4:
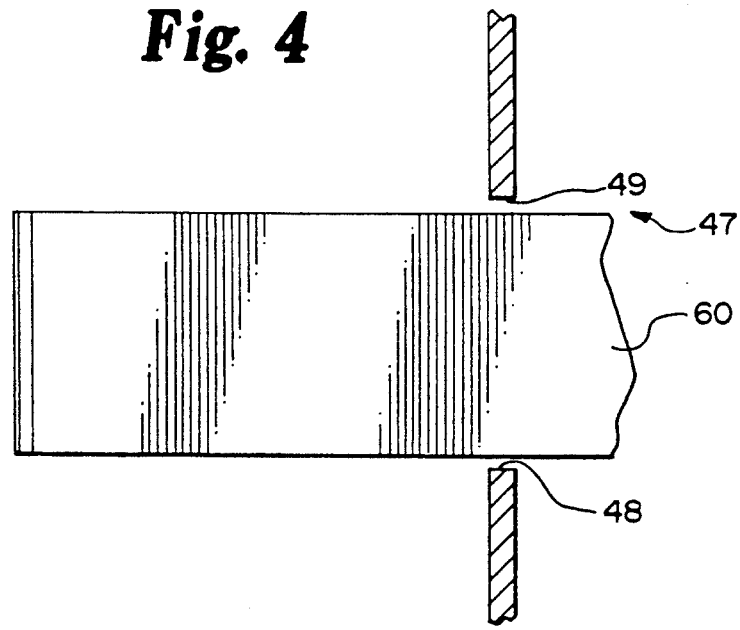
FIG. 4 is a fragmentary, sectional view taken along line 4—4 of FIG. 2.

Notches 46, 47 in side margins 44, 45 of main frame 22 limit the range of motion of main frame 22 relative to the bracket member 26. Referring to FIG. 4, if the main frame 22 is vibrating in a fore and aft motion, abutment margins 48, 49 will come into contact with the side channels of bracket member 26. Side to side motion of the main frame 22 relative to the bracket member 26 would also be limited by engagement of abutment margins 50 with the side channels of bracket member 26. Motion limitation of chassis 10 is important, since support bracket member 26 is connected to main frame 22 only through vibration damper 68. If the motion of chassis 10 is not limited, vibration damper 68 could be sheared, and connector 72 could be bent, thereby damaging the connection of support bracket member 26 to main frame 22.

The mounting system of the present invention can be used for a wide variety of equipment and products, such as wood chip shredders, pumps, grinder tillers, pressure washers, and the like. Numerous characteristics and advantages of the invention covered by this document have been set forth in the foregoing description. It will be understood, however, that this disclosure is, in many respects, only illustrative. Changes may be made in details, particularly in matters of shape, size and arrangement of parts without exceeding the scope of the invention. The invention's scope is, of course, defined in the language in which the appended claims are expressed.

We claim:

1. A portable chassis for transportable mounting of vibrating equipment, comprising:

a main frame operably supporting said vibrating equipment having opposed first and second ends, said main frame defining a center line extending between said first and second ends and including opposed side margins generally spaced apart from said center line;

a ground engaging wheel assembly operably coupled to said main frame first end;

ground engaging bracket means for operably supporting said main frame second end, said bracket means comprising a support member extending generally normal to said center line and outwardly beyond said side margins, said support member extending across said center line at a bracket means intersection point;

damper means for operably coupling said main frame to said ground engaging bracket means, said damper means comprising coupling means oriented along said center line and being interposed between and operably coupling said main frame to said support member generally at said intersection point, said, damper coupling means comprising resilient means interposed between said main frame and said support member, said resilient means comprising an elastomeric element, and means for selectively adjusting a hardness of said resilient means, said means for selectively adjusting the hardness of said resilient means comprising means for selectively compressing said elastomeric element.

2. The invention as claimed in claim 1, including motion limiting means operably coupled to said main frame for limiting a range of relative movement between said main frame and said bracket means to a predetermined range of relative motion.

3. The invention as claimed in claim 2, said motion limiting means including means for limiting fore and aft relative motion between said main frame and said bracket means.

4. The invention as claimed in claim 3, said motion limiting means including means for limiting side to side relative motion between said main frame and said bracket means.

5. The invention as claimed in claim 4, said motion limiting means comprising structure defining support member receiving notches in said main frame, said notches including abutment margins for engaging said support member at limits of said predetermined range of relative motion.

6. The invention as claimed in claim 1, said ground engaging wheel assembly comprising a pair of opposed wheels.

7. The invention as claimed in claim 6, said opposed wheels being operably, rotatably mounted on a common axle, said chassis including hitch means for towing said chassis and means operably coupling said hitch means with said common axle for transmitting towing forces from said hitch means to said main frame through said common axle.

* * * * *